United States Patent
Marquardt et al.

(10) Patent No.: US 9,883,544 B1
(45) Date of Patent: Jan. 30, 2018

(54) AUTOMATIC WIRELESS DOCKING SYSTEM

(71) Applicant: Dell Products L.P., Round Rock, TX (US)

(72) Inventors: Joseph Paul Marquardt, Menlo Park, CA (US); Todd Farrell Basche, Los Altos, CA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 15/274,426

(22) Filed: Sep. 23, 2016

(51) Int. Cl.
| | |
|---|---|
| H04M 1/00 | (2006.01) |
| H04B 1/38 | (2015.01) |
| H04W 76/02 | (2009.01) |
| H04W 40/24 | (2009.01) |
| H04L 29/08 | (2006.01) |
| H04W 4/00 | (2009.01) |
| H04W 80/00 | (2009.01) |

(52) U.S. Cl.
CPC ......... *H04W 76/023* (2013.01); *H04L 67/104* (2013.01); *H04W 4/008* (2013.01); *H04W 40/244* (2013.01); *H04W 80/00* (2013.01)

(58) Field of Classification Search
CPC ........... H04M 1/7253; H04M 2250/02; H04W 84/18; H04W 76/02; H04W 88/06
USPC ........... 455/41.2, 41.3, 423, 420, 553.1, 566
See application file for complete search history.

(56) References Cited

U.S. PATENT DOCUMENTS

| | | | | |
|---|---|---|---|---|
| 8,374,157 | B2 * | 2/2013 | Tamir | G06F 1/1632 370/338 |
| 9,560,143 | B2 * | 1/2017 | Gwin | H04L 67/142 |
| 2002/0171624 | A1 * | 11/2002 | Stecyk | H04L 12/2805 345/156 |
| 2003/0075983 | A1 * | 4/2003 | Stecyk | H04L 12/2805 307/38 |
| 2011/0098087 | A1 * | 4/2011 | Tseng | G01C 21/265 455/557 |
| 2011/0291927 | A1 * | 12/2011 | Slaby | B60R 11/0241 345/158 |
| 2014/0075075 | A1 * | 3/2014 | Morrill | G06F 1/1632 710/303 |
| 2014/0152235 | A1 * | 6/2014 | Huang | G06F 1/1632 320/107 |
| 2016/0127486 | A1 * | 5/2016 | Chen | G06F 3/04817 709/206 |
| 2017/0094133 | A1 * | 3/2017 | Hamsici | G06F 1/1632 |

* cited by examiner

*Primary Examiner* — Dominic Rego
(74) *Attorney, Agent, or Firm* — Haynes and Boone, LLP

(57) ABSTRACT

An automatic wireless docking system includes a source device that includes a source device display screen, a display device, and a sink device that is coupled to the display device. The sink device determines a location of the source device and determines a motion of the source device. The sink device then identifies a wireless docking intent of the source device with the sink device based on the location of the source device and the motion of the source device. In response to identifying the wireless docking intent, the sink device establishes a current wireless docking session between the source device and the sink device.

20 Claims, 7 Drawing Sheets

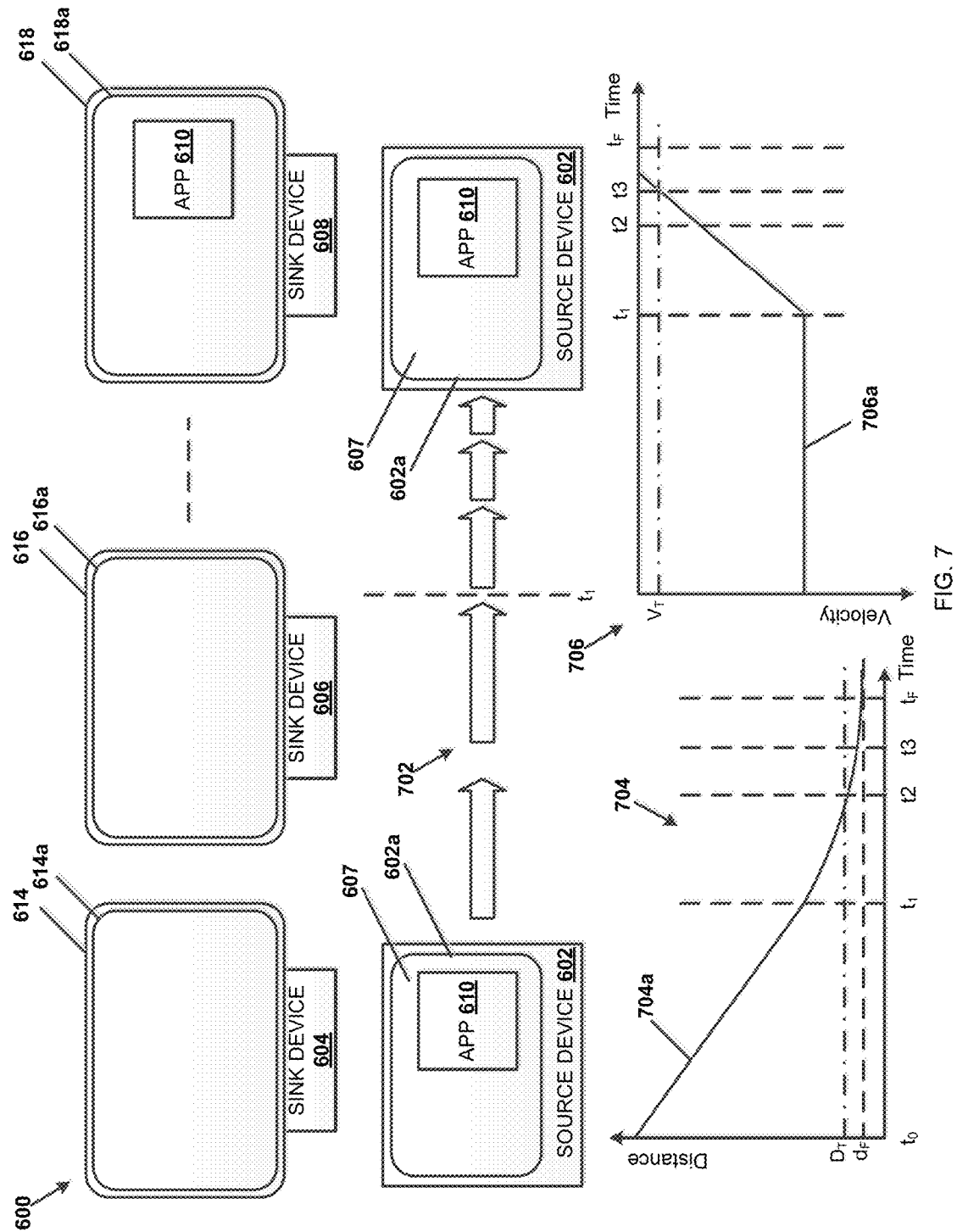

AUTOMATIC WIRELESS DOCKING SYSTEM

BACKGROUND

The present disclosure relates generally to information handling systems, and more particularly to the automatically wireless docking of information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are often utilized for the provisioning and display of content. For example, source devices such as, for example, laptop/notebook computing devices, tablet computing devices, and/or mobile phones, may identify content to provide to sink devices such as, for example, projector systems, display systems (e.g., televisions), dongle systems, and/or content management systems, in order to have those sink devices provide that content for display on a display device (e.g., a display screen of the projector, a connected or integrated display device, etc.). Before the source device provides content to the sink device, a docking session may be initiated between the source device and the sink device. In some situations, the docking session may be established by physically connecting the source device to the sink device. However, physically connecting the source device to the sink device requires additional hardware and/or cables to establish the docking session. To eliminate the need for additional hardware and/or cables, the docking session may be established as a wireless docking session through a wireless communication protocol. Wirelessly docking the source device to the sink device conventionally may require a user to log into the source device to initiate a wireless docking session each time the user wishes to utilize a sink device, which is a time consuming process. Furthermore, conventional wireless docking systems depend on at least one of the source device and sink device detecting the other's signal, which can result in issues when there are multiple sink devices in range of the source device. For example, each of a plurality of sink devices may attempt to wirelessly dock with a source device that moves within its wireless docking range, even though the user of the source device does not intend to wirelessly dock with any of those sink devices, or intends only to wirelessly dock with a particular one of those sink devices. Lastly, conventional wireless docking systems do not provide an additional security factor from which to identify a user from a wireless docking session without login credentials.

Accordingly, it would be desirable to provide an improved wireless docking system.

SUMMARY

According to one embodiment, an information handling system (IHS) includes a communication subsystem that is configured to provide communication with source devices; a processing system that is coupled to the communication subsystem; and a memory system that is coupled to the processing system and that includes instructions that, when executed by the processing system, cause the processing system to provide a wireless docking engine that is configured to: determine, via the communication subsystem, a location of a first source device; determine, via the communication subsystem, a motion of the first source device; identify a wireless docking intent of the source device based on the location of the source device and the motion of the source device; and establish, in response to identifying the wireless docking intent, a current wireless docking session with the first source device.

BRIEF DESCRIPTION OF THE DRAWINGS

FIG. 7 is a schematic view illustrating an embodiment of a sink device of a plurality of sink devices displaying the content information identified by the source device in FIG. 6 after an automatic docking session is established with the sink device.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
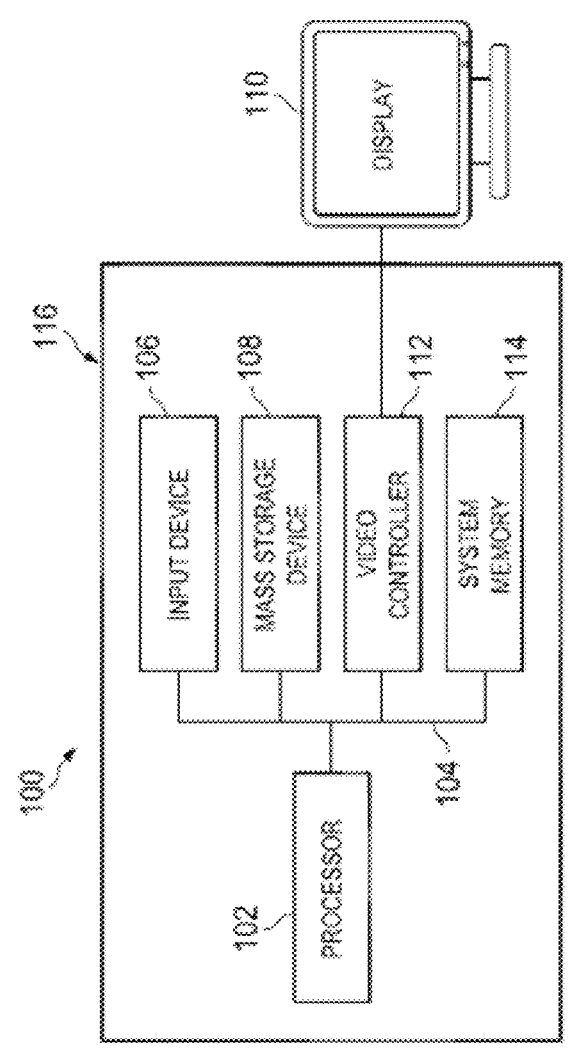
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
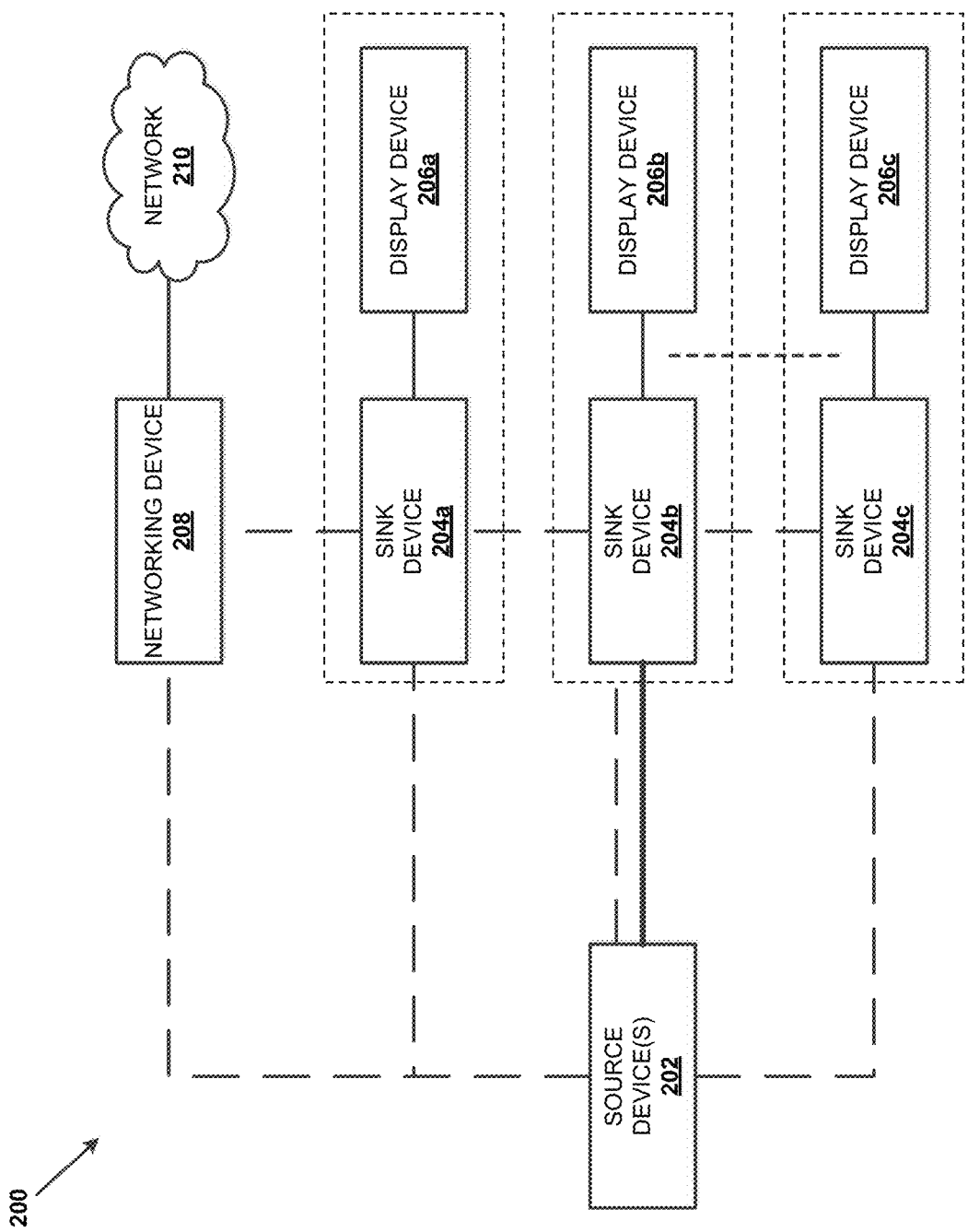
FIG. 2 is a schematic view illustrating an embodiment of an automatic wireless docking system.

Referring now to FIG. 2, an embodiment of an automatic wireless docking system 200 is illustrated that includes one or more source devices 202. In an embodiment, the source device 202 may be the IHS 100 discussed above with reference to FIG. 1, and/or may include some or all of the components of the IHS 100. In the examples discussed below, the source device 202 is described as a mobile computing device such as a laptop/notebook computer device, a tablet computing device, and a mobile phone. However, in other embodiments, the source device 202 may be provided by a desktop computing device, a server computing device, and/or a variety of other computing devices that would be apparent to one of skill in the art in possession of the present disclosure. The source device 202 is configured for wireless communication with one or more sink devices 204a, 204b, and up to 204c. Furthermore, in the embodiment illustrated in FIG. 2, the source device 202 is illustrated as being wirelessly docked with the sink device 204b (as denoted by the bold, solid line), or associated with a wireless docking intent of a user of the source device 202 that intends to wirelessly dock the source device 202 with the sink device 204b.

In an embodiment, any or all of the sink devices 204a-c may be the IHS 100 discussed above with reference to FIG. 1, and/or may include some or all of the components of the IHS 100. In the examples discussed below, each of the sink devices 204a-c are described as a shared display system that may include a projector computing system, a dongle computing system (e.g., including a GOOGLE® CHROMECAST® dongle computing device, an AMAZON® FIRE TV STICK® dongle computing device, etc.), a television display system, a content management display system (e.g., including an APPLE TV® content management system), and other shared display systems know in the art. However, in other embodiments, each of the one or more sink devices 204a-c may be provided by a variety of other computing devices that include display screens that may be utilized by the source device 202 as would be apparent to one of skill in the art in possession of the present disclosure.

In an embodiment, the couplings between the source device 202 and the sink devices 204a-c, as well as between each of the sink devices 204a-c, are communicative couplings that provides for the transmission of source device information and other data between each of the source device 202 and the sink devices 204a-c to determine a wireless docking intent of the source device 202 with one or more of the sink devices 204a-c. In the examples discussed below, the couplings between the source device(s) 202 and the sink device 204a are described as wireless couplings provided by wireless communication subsystems that may include WiFi communication subsystems, BLUETOOTH® communication subsystems, and/or other wireless communication subsystems known in the art. However, in other embodiments, some couplings between the source devices 202 and any or all of the sink devices 204a-c, or between any of the sink devices 204a-c, may be provided by wired connections, combined wireless/wired connections, and/or any other coupling that is configured to transmit the data as discussed below.

Each of the sink devices 204a-c is coupled to a respective display device 206a, 206b, and 206c. In some embodiments, each sink device 204a-c and its respective display device 206a-c may be separate components such as, for example, the projector computing device/sink device and projector screen/display device, the dongle computing device/sink device and display device, and/or the content management computing device/sink device and display device described herein. However, in other embodiments, the each sink device 204a-c and its respective display device 206a-c may be an integrated component (as illustrated by the dashed boxes in FIG. 2) such as, for example, the television display device and/or other computing devices described herein. As such, the coupling between each sink device 204a-c and its respective display device 206a-c that is illustrated in FIG. 2 need not be a physical coupling, but rather may be provided by positioning the each sink device 204a-c appropriately relative to its respective display device 206a-c (e.g., as with a projector computing device/sink device positioned appropriately to provide images on a projector screen/display device). However, in some embodiments, the coupling between the each sink device 204a-c and its respective display device 206a-c that is illustrated in FIG. 2 may be a physical external coupling such as a cable between each sink device 204a-c and its respective display device 206a-c (as is used with content management display systems), or a mated connection between each sink device 204a-c and its respective display device 206a-c (as is used with dongle computing systems). Furthermore, in some embodiments, the coupling between each sink device 204a-c and its respective display device 206a-c that is illustrated in FIG. 2 may be a physical internal coupling such as a coupling provided between a processing system and a display subsystem in a television display device and/or other computing device.

In the illustrated embodiment, each sink device 204a-c is coupled to an access point 208 that is further coupled to a network 210. In an embodiment, the access point 208 may be the IHS 100 discussed above with reference to FIG. 1, and/or may include some or all of the components of the IHS 100. In the examples discussed below, the access point 208 is described as a wireless access point that may be connected to or integrated in a router device. However, in other embodiments, the access point 208 may be provided by any networking device (wired or wireless) that provides for a connection to the network 210. While the network 210 is described in many of the examples below as the Internet, in some embodiments the network 210 may include a Local Area Network (LAN) or other network known in the art as well. As discussed below, the coupling between each sink device 204*a-c* and the access point 208 may include one or more wired communication channels, and/or one or more wireless communication channels such as, for example, a WiFi communication channel, a Peer-To-Peer (P2P) communication channel (e.g., a BLUETOOTH® communication channel or Near Field Communication (NFC) channel), and/or any of a variety of other communication channels known in the art. However, in some embodiments, the access point 208 may be omitted such that the automatic wireless docking system 200 includes the source device 202 coupled to at least one of the one or more sink device 204*a-c* and its respective display device 206*a-c* via a LAN and without access to the Internet. Furthermore, in some embodiments one or more of the sink devices 204*a-c* and the access point 208 may be combined into an integrated component.

As also illustrated in FIG. 2, the source device 202 may optionally be coupled directly to the access point 208 to access the network 210, and the optional coupling between any source device 202 and the access point 208 may include one or more wired communication channels, and/or one or more wireless communication channels such as, for example, a WiFi communication channel, a Peer-To-Peer (P2P) communication channel (e.g., a BLUETOOTH® communication channel or Near Field Communication (NFC) channel), and/or any of a variety of other communication channels known in the art. However, in some embodiments, the optional connection between the source device 202 and the access point 208 may be omitted, and the source device 202 may be coupled to the access point 208 through any of the sink devices 204*a-c* to access the network 210 as discussed below. Thus, while a specific embodiment of the automatic wireless docking system 200 is illustrated and described herein, one of skill in the art in possession of the present disclosure will recognize that a wide variety of modification to the components and configuration of the layered content display system 200 will fall within the scope of the present disclosure.

Figure 3:
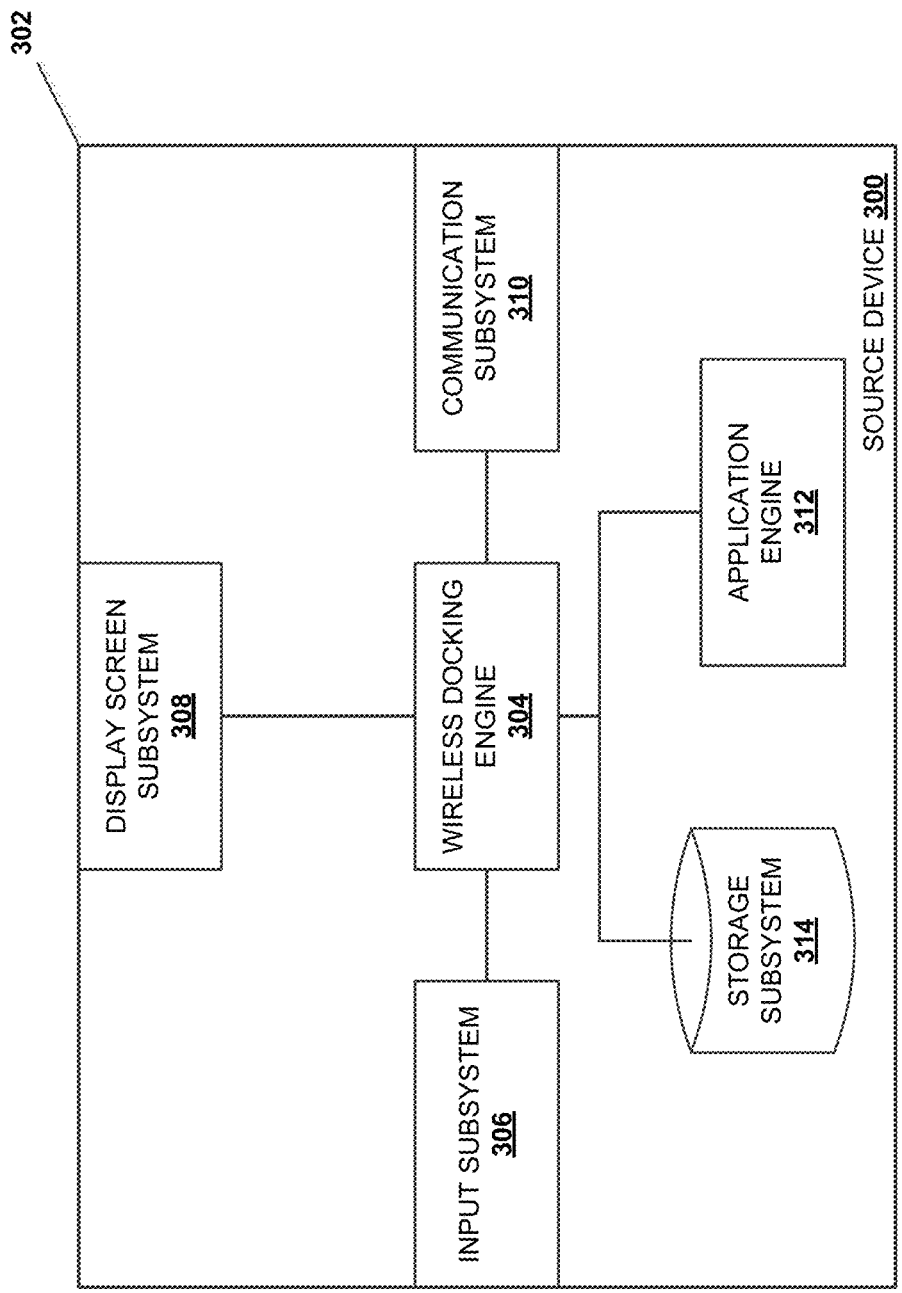
FIG. 3 is a schematic view illustrating an embodiment of a source device used in the automatic wireless docking system of FIG. 2.

Referring now to FIG. 3, an embodiment of a source device 300 is illustrated that may be the source device 202 discussed above with reference to FIG. 2. As such, the source device 300 may be the IHS 100 discussed above with reference to FIG. 1, and/or may include some or all of the components of the IHS 100. As discussed above, while the source device 300 is described below as a mobile computing device such a laptop/notebook computer device, tablet computing device, and mobile phone, the source device 300 may be provided by desktop computing devices, server computing devices, and/or a variety of other computing devices that would be apparent to one of skill in the art in possession of the present disclosure. In the illustrated embodiment, the source device 300 includes a chassis 302 that houses the components of the source device 300, only some of which are illustrated in FIG. 3. For example, the chassis 302 may house a processing system (not illustrated, but which may be provided by the processor 102 discussed above with reference to FIG. 1) and a memory system (not illustrated, but which may be provided by the memory 114 discussed above with reference to FIG. 1) that includes instructions that, when executed by the processing system, cause the processing system to provide a wireless docking engine 304 that is configured to perform the functions of the wireless docking engines and source devices discussed below. In a specific example, the processing system in the source device 300 may include a graphics processing unit (GPU) that is configured to render information for display via the sink devices as discussed below.

The chassis 302 also houses an input subsystem 306 that is coupled to the display engine 304 (e.g., via a coupling between the processing system and the input subsystem 306). In an embodiment, the input subsystem 306 may be provided by a keyboard input subsystem, a mouse input subsystem, a track pad input subsystem, a touch input display subsystem, and/or any other input subsystem known in the art. The chassis 302 also houses a display screen subsystem 308 that is coupled to the wireless docking engine 304 (e.g., via a coupling between the processing system and the display screen subsystem 308). In an embodiment, the display screen subsystem 308 may be provided by a display device that is integrated into the source device 300 and that includes a display screen (e.g., a display screen on a laptop/notebook computing device, a tablet computing device, or a mobile phone), or by a display device that is coupled directly to the source device 300 (e.g., a display device coupled to a desktop computing device by a cabled or wireless connection). The chassis 302 also houses a communication subsystem 310 that is coupled to the wireless docking engine 304 (e.g., via a coupling between the processing system and the communication subsystem 310). In an embodiment, the communication subsystem 310 may be provided by a wireless communication subsystem (e.g., a WiFi communication subsystem, a BLUETOOTH® communication subsystem, and/or other wireless communication subsystems known in the art), a network interface controller (NIC), and/or other communication subsystems known in the art.

In an embodiment, the memory system may also include instructions that, when executed by the processing system, cause the processing system to provide an application engine 312 that is configured to perform the functions of the application engines and source devices discussed below. The application engine 312 may provide any of a variety of applications known in the art on the source device 300, and may be configured to communicate with the wireless docking engine 304 as discussed below. In a specific example, the application engine may provide an operating system for the source device 300, as well as particular applications used in the examples discussed below. The chassis 302 may also house storage device (not illustrated, but which may be the storage device 108 discussed above with reference to FIG. 1) that provides a storage subsystem 314 that is configured to store the source device information discussed below, as well as other data utilized by components (e.g., the application engine 312) in the source device 300. While a specific embodiment of the source device 300 is illustrated and described herein, one of skill in the art in possession of the present disclosure will recognize that a wide variety of modification to the components and configuration of the source device 300 will fall within the scope of the present disclosure.

Figure 4:
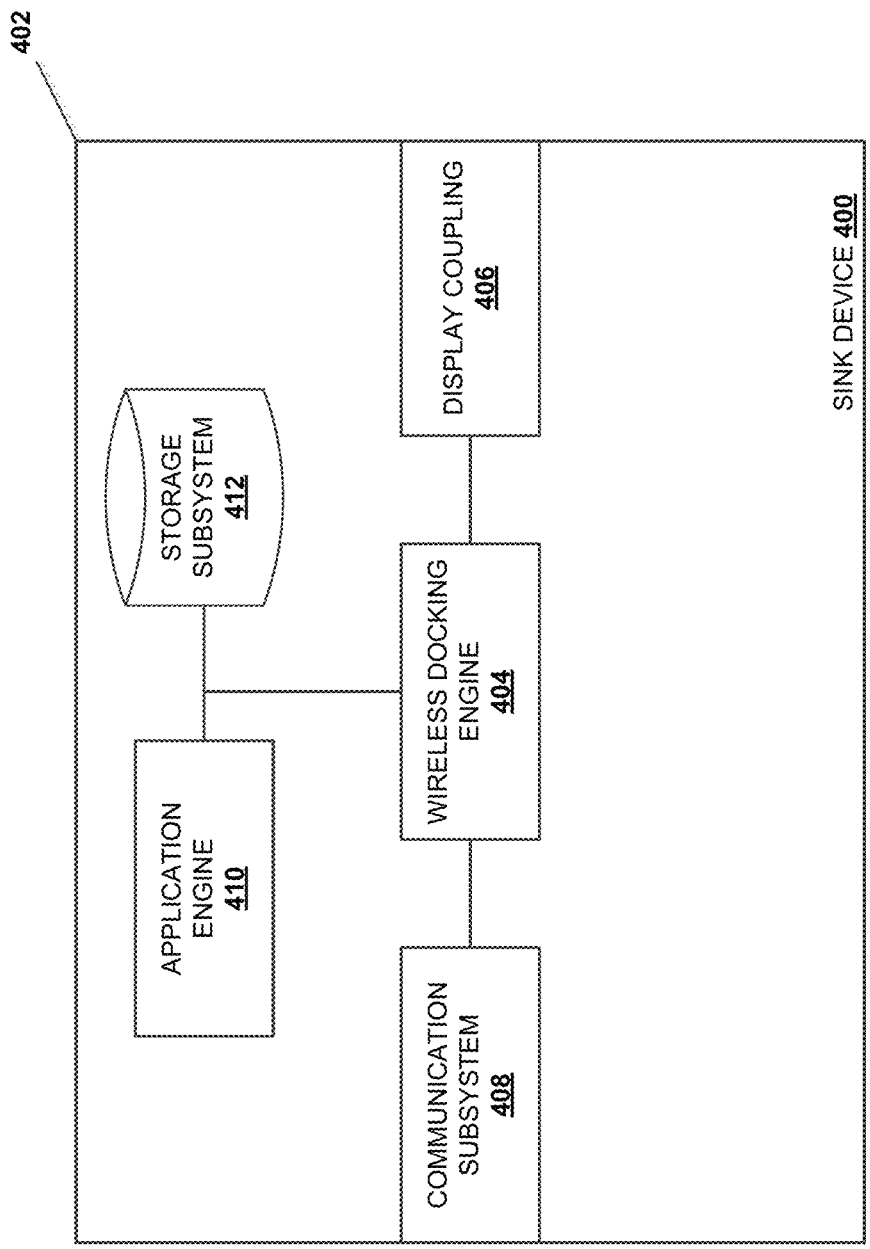
FIG. 4 is a schematic view illustrating an embodiment of a sink device used in the automatic wireless docking system of FIG. 2.

Referring now to FIG. 4, an embodiment of a sink device 400 is illustrated that may be any of the one or more sink devices 204*a*, 204*b*, and 204*c* discussed above with reference to FIG. 2. As such, the sink device 400 may be the IHS 100 discussed above with reference to FIG. 1, and/or may include some or all of the components of the IHS 100. As discussed above, while the sink device 400 is described as a shared display system such as projector computing system, a dongle computing system, a television display system, and a content management display system, the sink device 400 may be provided by a variety of other computing devices that include display screens that may be utilized by the source devices as discussed below. In the illustrated embodiment, the sink device 400 includes a chassis 402 that houses the components of the sink device 400, only some of which are illustrated in FIG. 4. For example, the chassis 402 may house a processing system (not illustrated, but which may be provided by the processor 102 discussed above with reference to FIG. 1) and a memory system (not illustrated, but which may be provided by the memory 114 discussed above with reference to FIG. 1) that includes instructions that, when executed by the processing system, cause the processing system to provide a wireless docking engine 404 that is configured to perform the functions of the wireless docking engines and sink devices discussed below. In a specific example, the processing system in the sink device 400 may include a graphics processing unit (GPU) that is configured to render information for display as discussed below, and in particular, the GPU in the sink device 400 may be configured with graphics drivers (e.g., OPENGL® available at www.opengl.org) for applications running on the source devices.

The chassis 402 also houses a display coupling 406 that is coupled to the wireless docking engine 404 (e.g., via a coupling between the processing system and the display coupling 406). In an embodiment, the display coupling 406 may be provided by an external connector (e.g., that is configured to connect to a display device 206a, 206b, or 206c via a display cable, configured to connect directly to an external connector on the display device 206a, 206b, or 206c, etc.), an internal connector (e.g., between the processing system and the display device 206a, 206b, or 206c that is integrated with the sink device 400 and includes a display screen), an image projection component (e.g., a projector lens), and/or a variety of other display couplings that would be apparent to one of skill in the art in possession of the present disclosure. The chassis 402 also houses a communication subsystem 408 that is coupled to the wireless docking engine 404 (e.g., via a coupling between the processing system and the communication subsystem 408). In an embodiment, the communication subsystem 408 may be provided by a wireless communication subsystem (e.g., a WiFi communication subsystem, a BLUETOOTH® communication subsystem, and/or other wireless communication subsystems known in the art), a network interface controller (NIC), and/or other communication subsystems known in the art.

In some embodiments, the memory system may also include instructions that, when executed by the processing system, cause the processing system to provide an application engine 410 that is configured to perform the functions of the application engines and sink devices discussed below. The application engine 410 may be configured to provide any of a variety of applications known in the art on the sink device 400, and may be configured to communicate with the wireless docking engine 404 as discussed below. For example, as discussed in further detail below, the application engine 410 in the sink device 400 may be configured to execute applications locally in the sink device 400 that are also being executed on a source device in order give the appearance of the "sharing" of those applications with a display device. The chassis 402 may also house storage device (not illustrated, but which may be the storage device 108 discussed above with reference to FIG. 1) that provides a storage subsystem 412 that is configured to store the source device information, motion profiles, and beacon information discussed below, as well as other data utilized by components (e.g., the application engine 410) in the sink device 400. While a specific embodiment of the sink device 400 is illustrated and described herein, one of skill in the art in possession of the present disclosure will recognize that a wide variety of modification to the components and configuration of the sink device 400 will fall within the scope of the present disclosure.

Figure 5:
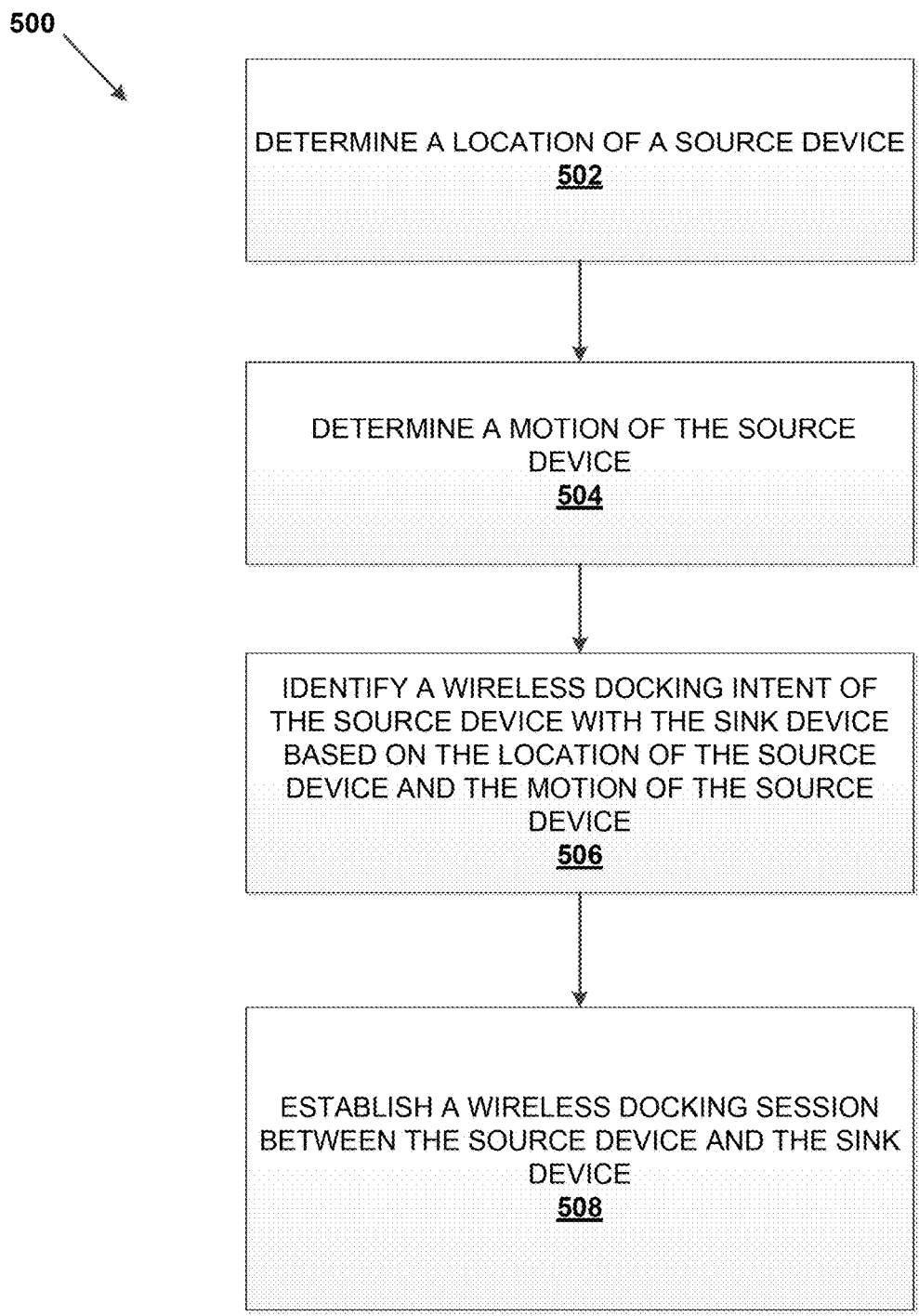
FIG. 5 is a flow chart illustrating an embodiment of a method for providing automatic wireless docking.

Referring now to FIG. 5, an embodiment of a method 500 for automatic wireless docking is illustrated. As discussed above, the conventional wirelessly docking of a source device to a sink device typically requires a user to log into the source device to initiate a wireless docking session each time the user wishes to utilize a sink device, which is a time consuming process. Furthermore, such conventional wireless docking systems often depend on at least one of the source device and sink device detecting the other's signal, which can result in issues when there are multiple sink devices in range of the source device. For example, each of a plurality of sink devices may attempt to wirelessly dock with a source device that moves within its range, even though the user does not intend to wirelessly dock with any of those sink devices, or intends only to wirelessly dock with a particular one of those sink devices. The systems and methods of the present disclosure overcome these limitations by providing an automatic wireless docking solution that provides for the automatic wireless docking of a source device with a sink device in response to determining a wireless docking intent of a user of the source device that indicates that the user intends to wirelessly dock the source device with the sink device. In some embodiments, the wireless docking intent may be determined using a detected location and a detected motion of the source device. As a result, when multiple sink devices that are each configured to wirelessly dock with the source device are present in an environment, a wireless docking session may be automatically established between the source device and only the sink device that the user intends to wirelessly dock, while bypassing wireless docking sessions with the remaining sink devices even though the remaining sink devices may be in range of the source device such that a wireless docking session is available.

The method 500 begins at block 502 where a sink device determines a location of a source device. In an embodiment, prior to the method 500, the source device 202 may establish an initial wireless communication session with the sink device 204b, which is the sink device of the plurality of sink devices 204a-c illustrated in FIG. 2 that is associated with a wireless docking intent of a user of the source device 202 (as indicated by the bold, solid line) as discussed above. In one example, the source device 202 may establish the initial wireless communication session with the sink device 204b directly through one or more wireless communication protocols such as, for example, a WiFi communication protocol, a Peer-To-Peer (P2P) communication protocol (e.g., a BLUETOOTH® communication protocol or Near Field Communication (NFC) protocol), and/or any of a variety of other communication protocols known in the art. In another example, if the sink device 204b is not in a communication range of the source device 202, the initial wireless communication session between the sink device 204b and the source device 202 may be established through sink device 204a and/or 204c (e.g., data for establishing the initial wireless communication session between the source device 202 and the sink device 204b may be routed through the sink device 204a and/or 204c). In yet another example, the initial wireless communication between the sink device 204b and the source device 202 may be established through the access point 208 either through a direct connection between the access point 208 and the source device 202, through the network 210, and/or through the sink devices 204a and/or 204b.

In an embodiment, the initial wireless communication session may be established using a limited wireless communication connection procedure performed by the sink device 204b such that the sink device 204b only retrieves source device information that is necessary to determine the location of the source device 202. For example, the establishment of the initial wireless communication session may include the sink device 204b monitoring its environment (e.g., monitoring for signals in a communication range of the sink device 204b) and receiving a source device identifier advertised by the source device 202. In other examples, the establishment of initial wireless communication session may further include the sink device 204b performing a wireless communication connection procedure to retrieve other source device information and capabilities from the source device 202 that may be used to determine a wireless docking intent of the user of the source device 202. One skilled in the art in possession of the present disclosure will recognize that the initial wireless communication session may involve a variety of wireless communication connection procedures that allow for the determination of the wireless docking intent discussed below without establishing the wireless docking session discussed below. As such, each of the sink devices 204a-c may perform wireless communication connection procedures to determine wireless docking intent of the source device 202, while only having one of those sink devices 204a-c establish a wireless docking session with the source device 202.

Figure 6:
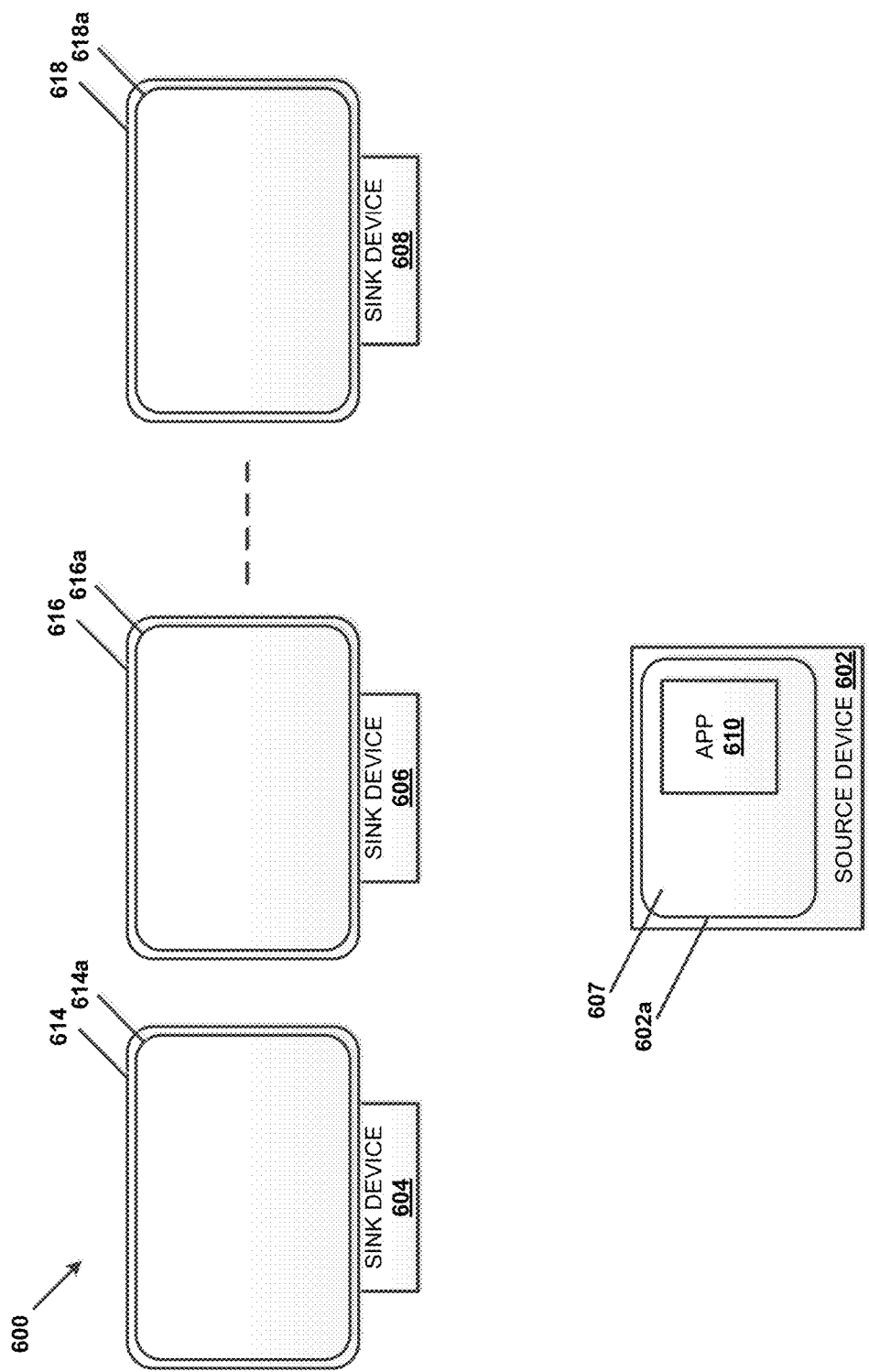
FIG. 6 is a schematic view illustrating an embodiment of a source device displaying content information.

Referring now to FIG. 6, an embodiment of an automatic wireless docking system 600 is illustrated that is substantially similar to the automatic wireless docking system 200 discussed above and that includes a source device 602 having a source device display screen 602a. The automatic wireless docking system 600 also includes sink devices 604, 606, and up to 608, each having a respective display device 614, 616, and 618 that includes a respective display screen 614a, 616a, and 618a. In the illustrated embodiment, the application engine 312 in the source device 602 is operating to provide content information on the source device display screen 602a that includes an operating system desktop 607, along with an application 610 (e.g., an Internet browser, a word processor, a media player, a spreadsheet application, etc.). However, one of skill in the art in possession of the present disclosure will recognize that any of a variety of content information may be provided by the source device 602 while remaining within the scope of the present disclosure.

At block 502 of the method 500, the sink device 608 may be the sink device 204b (i.e., the sink device of the sink devices 604-608 discussed above that is associated with a wireless docking intent of a user of the source device 602.) At block 502, the sink device 608 may determine the location of the source device 602 by receiving source device information directly from the source device 602 that includes location information. For example, the source device 602 may be configured with a global positioning system (GPS) that determines location information for the source device 602 (e.g., GPS coordinates), and the source device 602 may transmit that location information to the sink device 608. In another example, the communication subsystem 310 of the source device 602/300 may provide location information by broadcasting or otherwise transmitting a source device identifier (e.g., a Media Access Control (MAC) address, an Internet Protocol (IP) address, a universal unique identifier (UUID) and/or other identifiers known in the art) that is received by the communication subsystem 408 of the sink device 608/400. The wireless docking engine 404 in the sink device 608/400 may then determine a location of the source device 602 (e.g., a proximity of the source device 602 to the sink device 608) based on a signal strength of the signal that provides the received source device identifier. In yet another example, the sink device 608 may receive source device information from the source device 602 that has been transmitted through the sink device 604, the sink device 606, and/or the access point 208, and that includes the source device identifier along with signal strength information determined by the device (i.e., the sink device 604, the sink device 606, and/or access point 208) that originally received the signal that provided that source device information. In some embodiments, the sink device 608 may use combinations of location information provided in the source device information that is received directly and from the sink device 604, the sink device 606, and/or access point 208 to provide for a more accurate determination of the location of the source device 602 (e.g., by averaging that location information, discarding outlier location information, etc.).

In another example, the sink devices 604-608 and/or the access point 208 may be synchronized such that clocks or other timing subsystems included with each of the sink devices 604-608 and/or the access point 208 are each set to substantially the same time. As such, any combination of the sink devices 604-608 and/or the access point 208 may receive location information that is broadcast or transmitted by the source device 602 and that includes the source device identifier of the source device 602. Depending on the location of the sink devices 604-608 and/or access point 208, relatively to the source device 602 at the time the location information is broadcast or transmitted, each sink device 604-608 and/or access point 208 will receive that location information at different times, and each sink device 604-608 and/or access point 208 receiving the location information may create a respective time stamp at the time of arrival of the location information and associate the time stamp with the source device identifier. Subsequently, each sink device 604-608 and/or access point 208 may share their respective time stamp and the associated source device identifier that was received with each other sink device 604-608 and/or access point 208, which allows each sink device 604-608 to determine a location of the source device 602 using on the time stamps and based on triangulation techniques, trilateration techniques, multilateration techniques, and/or other location determination techniques known in the art.

In an embodiment, the automatic wireless docking system 600 may include a plurality of beacon devices that are positioned in an environment of sink devices 604-608 and/or that are included on one or more of the sink devices 604-608. For example, each beacon device may include a clock or other timing subsystem that is set to substantially the same time, and each beacon device may be configured to provide a pulse signal that includes a beacon identifier that identifies that beacon device and that is detectable by the source device 602. As such, each of the beacon devices may provide the pulse signal at substantially the same time, and the source device 602 may receive the pulse signals at different times due to the varying distances between the beacon devices and the source device 602. The source device 602 may then generate a time stamp for each pulse signal it receives, and associate that received time stamp with the respective beacon identifier for that pulse signal. This allows the source device 602 to determine its location based on the time stamps and the respective beacon identifiers (e.g., using the location determination techniques discussed above), and provide the location to one or more of the sink devices 604-608. Alternatively, the source device 602 may provide the time stamps and the respective beacon identifiers to one or more of the sink devices 604-608 so that those sink devices 604-608 may then determine the location of the source device 602 based on the time stamps, respective beacon identifiers, and known locations of the beacons associated with beacon identifiers. While a few examples of techniques for determining a location of a source device have been provided, one of skill in the art in possession of the present disclosure will recognize that other techniques for determining a location of the source device 602 at block 502 will fall within the scope of the present disclosure.

The method 500 then proceeds to block 504 where the sink device determines a motion of the source device. In an embodiment of block 504, during the initial wireless communication session(s) with the source device 602, any or all of the sink devices 604-608 may determine a motion of the sink device 602 based on tracking the location of the sink over time to determine one or more of a velocity of the source device 602, a speed of the source device 602, an acceleration of the source device 602, a direction of movement of the source device 602, and/or other motion characteristics known in the art. For example, one or more of the sink devices 604-608 may determine a first time that corresponds to the receipt of first location information from the source device 602 that includes the source device identifier provided by the source device 602, and then that sink device may subsequently determine a second time that corresponds to the receipt of second location information from the source device 602 that includes the source device identifier provided by the source device 602. Based on a time period between the first time and the second time, one or more of the sink devices 604-608 may determine the motion (e.g., the velocity) of the source device 602. In another example, the source device 602 may include a motion sensor such as an accelerometer, a magnetometer, an altimeter, a camera, a gyroscope, a micro-electro-mechanical system (MEMS) sensor, a barometer, an ambient light sensor, an inaudible high frequency sensor, and other sensors known in the art that may detect or otherwise determine the motion of the source device 602, and the source device 602 may provide source device information to any of the sink devices 604-608 that includes motion information about the source device 602 during the initial wireless communication session with one or more of the sink devices 604-608.

In another example, the source device information from the source device 602 may be received by one or more of the sink devices 604-608 via a respective wireless signal, and each of the sink devices 604-608 may determine the motion of the source device 602 based on the signal strength (e.g., a received signal strength indicator (RSSI)) of the wireless signal generated by the communication subsystem 310 of the source device 602/300 and received by that sink device. For example, as the source device 602 moves through the environment of the sink devices 604-608 (e.g., towards or away from sink device(s) and/or the access point), the signal strength of the signal broadcast or transmitted by the source device 602 and received by the sink devices 604-608 may increase or decrease depending on the relative distance between the source device 602 and the sink device receiving that signal. As such, a substantially constant signal strength of a signal received by a particular sink device may indicate that the source device 602 is stationary or moving in a manner that does not change the distance between the source device 602 and that sink device. Furthermore, when more than one of the sink devices 604-608 are monitoring the signal strength of signals received from the source device 602, a direction of the motion of the source device 602 may be determined from those signal strength determinations. For example, the sink device 604 may receive signals having a constant signal strength over a time period, the sink device 606 may receive signals having a decreasing signal strength over that time period, and the sink device 608 may receive signals having an increasing signal strength over that time period, and those signal strengths may be shared between the sink devices 604-608 to allow any or all of the sink device 604-608 to determine a velocity of the source device 602. While a few examples of techniques for determining a motion of a source device have been provided, one of skill in the art in possession of the present disclosure will recognize that other techniques for determining a motion of the source device 602 at block 504 will fall within the scope of the present disclosure.

Referring now to FIG. 7, an embodiment of determining the location and the motion of the source device 602 as the source device 602 moves in the environment of the sink devices 604-608 is illustrated. In the illustrated example, the source device 602 may enter the environment of the sink devices 604-608 (e.g., come within a communication range of at least one of the sink devices 604-608) at an initial time $t_0$ such that the source device 602 is detected by any one of the sink devices 604-608. However, in other examples, the source device 602 may be considered in the environment of the sink devices 604-608 or otherwise included as part of the automatic wireless docking system 600 prior to any of the sink devices 604-608 detecting the source device 602, and instead in response to at least one of the sink devices 604-608 receiving source device information from the source device 602 over the network 210 (e.g., via the access point 208). Upon entering the environment of the sink device 604-608, the source device 602 may continue to move throughout the environment of the sink device 604-608 as denoted by a path 702 until a final time $t_F$ when the source device 602 docks with one of the sink devices (i.e., the sink device 608 in this example). As the source device 602 moves through the environment of the sink devices 604-608, each of the sink devices 604-608 may respectively track the location and the motion of the source device 602 as discussed above. FIG. 7 illustrates a location graph 704 with a plot 704a of distance versus time, and a motion graph 706 with a plot 706a of velocity versus time, which may represent data generated by the sink device 608 in tracking location and motion of the source device 602 from the initial time $t_0$ to the final time $t_F$. As illustrated in the motion graph 706, the source device 602 begins at the initial time $t_0$ with a constant velocity until a time period between times $t_1$ and $t_3$ when the magnitude of the velocity decreases until the source device 602 stops moving just before the final time $t_F$. Correspondingly, the location graph 704 illustrates how the distance between the source device 602 and the sink device 608 decreases from the initial time $t_0$ until the source device 602 comes to rest just before the final time $t_F$ at a distance $d_F$ from the sink device 608.

The method 500 then proceeds to block 506 where the sink device identifies a wireless docking intent of the source device with the sink device based on the location of the source device and the motion of the source device. In an embodiment of block 506, the sink device 608 may identify the wireless docking intent of the source device 602 based on the tracked location of the source device 602 and the tracked motion of the source device 602. For example, the sink device 608 may determine the wireless docking intent of the source device 602 to dock with the sink device 608 when a location threshold is satisfied (e.g., when the location of the source device 602 is at or below a minimum distance from the location of the sink device 608, when a signal strength of a signal received from the source device is at or above a minimum signal strength, and/or the like) and when a motion threshold is satisfied (e.g., when the velocity of the source device 602 is at or below a predetermined velocity, when the source device 602 is detected as not moving, when the acceleration of the source device 602 is at or below a predetermined acceleration, when the source device 602 is detected as not accelerating, and/or via a variety of other motion characteristics that would be apparent to one of skill in the art in possession of the present disclosure). For example, FIG. 7 illustrates how the sink device 608 may monitor for a location threshold $D_T$ and a motion threshold $V_T$, and at time $t_2$, the location of the source device 602 may satisfy the threshold $D_T$ while the motion of the source device 602 may not satisfy the predetermined motion threshold $V_T$. Therefore, in the situation illustrated in FIG. 7, the sink device 608 may determine that no wireless docking intent of source device 602 and the sink device 608 exists at time $t_2$. However, at time $t_3$, the location of the source device 602 may continue to satisfy the threshold $D_T$, while the motion of the source device 602 may now satisfy the motion threshold $V_T$. Therefore, in the situation illustrated in FIG. 7, the sink device 608 may determine that the wireless docking intent of source device 602 with the sink device 608 exists at time $t_3$. Similarly, the sink device 604 and the sink device 606 may determine that no wireless docking intent of the source device 602 with either the sink device 604 or sink device 606 exists, as while the location of the source device 602 may satisfy the location threshold of one or both of the sink devices 604 and 606 as the source device 602 moves through the environment around the sink devices 604-608, the motion of the source device 602 during the time the location threshold is satisfied will not satisfy the motion threshold, and in response the sink devices 604 and 606 will not attempt to establish a wireless docking session with the source device 602 as discussed below.

In some embodiments, the location threshold and/or the motion threshold used in determining the wireless docking intent of the source device 602 may be dynamic. For example, the location threshold may be dependent on the current motion (e.g., a velocity) of the source device 602, and/or the motion threshold may be dependent on the current location of the source device 602. In a specific example, when the source device 602 is at rest, the location threshold may be greater than when the source device 602 has a velocity that is at the motion threshold. In an embodiment, the location threshold and motion threshold may change based on other source device information received form the source device 602, sink device information generated by the sink device or received from other sink devices, and/or other wireless docking system information that may be used to determine a wireless docking intent of the source device 602. For example, the location threshold and motion threshold may adjust based on the number of sink devices in the automatic wireless docking system 600, the number of sources devices 602 in the automatic wireless docking system 600, the type of display device connected to the sink device (e.g., a projector display in an conference room versus a display monitor on a desktop computer in a cubicle), a time of day, a type of source device (e.g., a tablet computer that may be further away and/or moving more than a laptop computer), a screen position on a display subsystem of the source device 602, whether a touch sensor on the source device 602 is activated, whether the application 610 is being displayed on the source device 602, user preferences defined by a user of the source device 602 that may prioritize particular sink devices, based on whether the ambient light sensor knows that source device 602 is open, and/or other wireless docking system information that one of skill in the art in possession of the present disclosure would recognize as being useful in determining a wireless docking intent. In a specific example, the wireless docking intent may be based on a wireless docking profile that is determined by the sink device 604 and/or source device 602 based on source device information, sink device information, networking device information, peripheral device information, etc. and may be performed according to the teachings of U.S. patent application Ser. No. 15/296,707, filed on Oct. 18, 2016, the disclosure of which is incorporated by reference in its entirety.

In an embodiment, the sink device 608 may determine a current motion profile for the source device 602 (e.g., associated with a source device identifier received from the source device 602) that is based on the location information received from the source device 602 and the motion information received from the source device 602, and that may be used to determine the wireless docking intent of the source device 602. For example, the current motion profile may be compared by the sink device to previously stored motion profiles that are associated with the source device identifier of the source device 602 and that resulted in the establishment of a previous wireless docking session between the source device 602 and sink device 608, and if the current motion profile satisfies a threshold similarity with at least one of the previously stored motion profiles, the wireless docking intent of the source device 602 with the sink device 608 may be determined. In some embodiments, the current motion profile may be used to allow the sink device 608 to determine the wireless docking intent of the source device 602 with the sink device 608 before the location threshold and/or the motion threshold are satisfied. For example, the source device 602 may take the substantially same path (e.g., the path 702) every day before establishing a wireless docking session with the sink device 608, and the sink device 608 may store the location plot 704a and motion plot 706a in association with the source device identifier of the source device 608 each day as a respective motion profile. In another example, the motion profile may be a composite of any or all of the location plots 704a and motion plots 706a that have previously resulted in a wireless docking session with the sink device 608. In yet another example, motion profiles for the source device 602 created by the sink device 604 and the sink device 606 may be previously stored motion profiles that are accessible by the sink device 608. In any of these examples, if the sink device 608 detects the source device 602 with locations and motions that provide a current motion profile that indicates that the source device 603 is moving along substantially the same path that includes a threshold similarity with one or more previously stored motion profiles (or a threshold number of previously stored motion profiles), the sink device 608 may determine that the wireless docking intent of the source device 602 with the sink device 608 exists. Additional use of the motion profiles include creation of security keys that provide user authentication derived from heuristic and/or prediction algorithms. The user keys may be used to set up security privileges for sink device and/or network access according to pre-specified security measures included with the sink device and/or networks. In an example, the motion profile would be used to limit access to the sink device and/or network unless a one or more source devices are not only in range of the sink device but are placed within specified areas and generate a specific motion profile.

The method 500 then proceeds to block 508 where the sink device establishes, a current wireless docking session between the source device and the sink device. In an embodiment of block 508, the wireless docking engine 404 of the sink device 608 may establish a wireless docking session in response to identifying the wireless docking intent of the source device 602 with the sink device 608. As illustrated in FIG. 7, at time $t_3$ a wireless docking session between the source device 602 and the sink device 608 may be established. In an embodiment, the wireless docking session may allow for content information from the source device 602 to be shared by the source device 602 with the sink device 608. For example, the source device 602 may operate to share the display of the application 610 with the sink device 608 such that the sink device 608 provides the application 610 for display on the display screen 618a of the display device 618. In another embodiment, the sink device 608 may provide the source device 602 a profiled wireless docking session, which may provide a customized user experience to a user of the source device 602 according to the teachings of U.S. patent application Ser. No. 15/296,707, filed on Oct. 10, 2016, the disclosure of which is incorporated by reference in its entirety. In another embodiment, wireless docking sessions may be provided to multiple source devices to enable multi-user display collaboration according to the teachings of U.S. patent application Ser. No. 15/266,376, filed on Sep. 15, 2016, the disclosure of which is incorporated by reference in its entirety. In yet another embodiment, the wireless docking session may provide for communications between the source device 602 and sink device 608 that allows the sink device 608 to provide layered content display according to the teachings of U.S. patent application Ser. No. 15/244,895, filed on Aug. 23, 2016, the disclosure of which is incorporated by reference in its entirety.

In an embodiment, subsequent to establishing the wireless docking session at block 508, the sink devices 604-608 may continue to determine the location of the source device 602 and the motion of the source device 602 while the source device 602 is wirelessly docked with the sink device 608 to determine a wireless undocking intent of the source device 602 that is similar to the wireless docking intent with the exception that the location and motion of the source device are used to determine that the source device 602 intends to undock with the sink device 608. For example, the sink device 608 may determine that a motion threshold and a location threshold have been satisfied by the motion and the location of the source device and that indicate a wireless undocking intent of the source device 602. In some situations, the motion threshold and the location threshold for the wireless undocking intent may be the same as the motion threshold and the location threshold for the wireless docking intent, while in other situations, they may differ. The sink device 608 may end the wireless docking session with the source device 608 when the wireless undocking intent is determined.

Thus, systems and methods have been described that provide for the automatic wireless docking of source device(s) with sink device(s) in response to the determination of a wireless docking intent that is based on the location of a source device and the motion of the source device. In response to the determination of a wireless docking intent of the source device with a sink device, a wireless docking session is automatically established between the source device and the sink device without the need for the user to log into the source device, the sink device, or any other subsystem, and while preventing unwanted sink devices from establishing wireless docking sessions with the source device. One of skill in the art in possession of the present disclosure will recognize that establishment of the wireless docking session based on the wireless docking intent provides for an automatic wireless docking system that wirelessly docks source device(s) with sink device(s) only when the user of the source device has moved that source device into a position that indicates that the user intends to wirelessly dock it with the sink device, while other sink devices within a communication range of that source device remain undocked with the source device even though those sink devices are in a proximity to the source device to allow automatic wireless docking with that source device.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An automatic wireless docking system, comprising:
a source device that includes a source device display screen;
a first display device; and
a first sink device that is coupled to the first display device and that is configured to:
  establish an initial wireless communication session with the source device and, in response, receive source device information that includes a source device identifier;
  determine a location of the source device;
  determine a motion of the source device;
  identify a wireless docking intent of the source device with the first sink device based on the location of the source device, the motion of the source device, and the source device identifier; and
  establish, in response to identifying the wireless docking intent, a current wireless docking session between the source device and the first sink device.

2. The system of claim 1, wherein the source device information includes at least one of location information used to determine the location of the source device and motion information used to determine the motion of the source device.

3. The system of claim 1, further comprising:
a plurality of second display devices; and
a plurality of second sink devices that are coupled to each other and the first sink device, wherein each of the plurality of second sink devices is coupled to a respective second display device of the plurality of second display devices, wherein the first sink device is configured to:
  receive, from one or more of the plurality of second sink devices, source device information communicated from the source device to the one or more of the plurality of second sink devices; and
  determine the location of the source device and the motion of the source device using the source device information.

4. The system of claim 1, further comprising:
a plurality of beacons coupled to the first sink device, wherein the first sink device is configured to:
receive beacon information from one or more of the plurality of beacons and source device information communicated between the source device and the one or more of the plurality of beacons; and
determine the location of the source device and the motion of the source device using the beacon information and the source device information.

5. The system of claim 1, wherein the first sink device is configured to:
determine a current motion profile associated with the source device identifier and based on location information received from the source device and motion information received from the source device, wherein the identifying the wireless docking intent of the source device with the first sink device includes:
comparing the current motion profile to previously stored motion profiles that are associated with the source device identifier and that resulted in the establishment of a previous wireless docking session including the source device; and
determining the current motion profile satisfies a threshold similarity with at least one of the previously stored motion profiles and, in response, establishing the current wireless docking session between the source device and the first sink device.

6. The system of claim 5, wherein the first sink device is configured to:
identify, subsequent to establishing the current wireless docking session, a wireless undocking intent of the source device with the first sink device based on the location of the source device and the motion of the source device; and
end, in response to identifying the wireless undocking intent, the current wireless docking session between the source device and the first sink device.

7. The system of claim 1, wherein the current wireless docking session between the source device and the first sink device includes displaying content information on the first display device that would otherwise be displayed on the source device display screen in the absence of the current wireless docking session.

8. An information handling system (IHS), comprising:
a communication subsystem that is configured to provide communication with source devices;
a processing system that is coupled to the communication subsystem; and
a memory system that is coupled to the processing system and that includes instructions that, when executed by the processing system, cause the processing system to provide a wireless docking engine that is configured to:
establish, via the communication subsystem, an initial wireless communication session with a source device and, in response, receive source device information that includes a source device identifier;
determine, via the communication subsystem, a location of the source device;
determine, via the communication subsystem, a motion of the source device;
identify a wireless docking intent of the source device based on the location of the source device, the motion of the source device, and the source device identifier; and
establish, in response to identifying the wireless docking intent, a current wireless docking session with the source device.

9. The IHS of claim 8, wherein the source device information includes at least one of location information used to determine the location of the source device and motion information used to determine the motion of the source device.

10. The IHS of claim 8, wherein the wireless docking engine is configured to:
receive, from one or more of a plurality of second IHS devices, source device information communicated from the source device to the one or more of the plurality of second IHS devices; and
determine the location of the source device and the motion of the source device based on the source device information.

11. The IHS of claim 8, wherein the wireless docking engine is configured to:
receive beacon information from one or more of a plurality of beacons and source device information communicated between the source device and the one or more of the plurality of beacons; and
determine the location of the source device and the motion of the source device based on the beacon information and the source device information.

12. The IHS of claim 8, wherein the wireless docking engine is configured to:
determine a current motion profile associated with the source device identifier and based on location information received from the source device and motion information received from the source device, wherein identify a wireless docking intent of the source device based on the location of the source device and the motion of the source device includes:
comparing the current motion profile to previously stored motion profiles that are associated with the source device identifier and that resulted in the establishment of a previous wireless docking session including the source device; and
determining the current motion profile satisfies a threshold similarity with at least one of the previously stored motion profiles and, in response, establishing the current wireless docking session between the source device and the communication subsystem.

13. The IHS of claim 8, wherein the wireless docking engine is configured to:
identify, subsequent to establishing the current wireless docking session, a wireless undocking intent of the source device with the communication subsystem based on the location of the source device and the motion of the source device; and
end, in response to identifying the wireless undocking intent, the current wireless docking session between the source device and the communication subsystem.

14. The IHS of claim 8, further comprising:
a first display device coupled to the processing system, wherein the current wireless docking session with the source device includes displaying content information on the first display device that would otherwise be displayed on a source device display screen included on the source device in the absence of the current wireless docking session.

15. A method for wireless automatic docking, comprising:
establishing, by a first sink device, an initial wireless communication session with a source device;

receiving, by the first sink device in response to establishing the initial wireless communication session with the source device, source device information that includes a source device identifier;

determining, by the first sink device, a location of the source device;

determining, by the first sink device, a motion of the source device;

identifying, by the first sink device, a wireless docking intent of the source device with the first sink device based on the location of the source device, the motion of the source device, and the source device identifier; and establishing, by the first sink device in response to identifying the wireless docking intent, a current wireless docking session between the source device and the first sink device.

16. The method of claim 15, wherein the source device information includes at least one of location information used to determine the location of the source device and motion information used to determine the motion of the source device.

17. The method of claim 15, further comprising:

receiving, by the first sink device from one or more of a plurality of second sink devices, source device information communicated from the source device to the one or more of the plurality of second sink devices; and determining, by the first sink device, the location of the source device and the motion of the source device using the source device information.

18. The method of claim 15, further comprising:

receiving, by the first sink device from one or more of a plurality of beacons, beacon information and source device information communicated between the source device and the one or more of the plurality of beacons; and determining, by the first sink device, the location of the source device and the motion of the source device using the beacon information and the source device information.

19. The method of claim 15, further comprising:

determining, by the first sink device, a current motion profile associated with the source device identifier and based on location information received from the source device and motion information received from the source device, wherein the identifying the wireless docking intent of the source device with the first sink device includes:

comparing the current motion profile to previously stored motion profiles that are associated with the source device identifier and that resulted in the establishment of a previous wireless docking session including the source device; and determining the current motion profile satisfies a threshold similarity with at least one of the previously stored motion profiles and, in response, establishing the current wireless docking session between the source device and the first sink device.

20. The method of claim 15, further comprising:

displaying content information on a first display device coupled to the first sink device that would otherwise be displayed on a source device display screen coupled to the source device in the absence of the current wireless docking session.

* * * * *